(12) United States Patent
Ogami et al.

(10) Patent No.: US 6,898,703 B1
(45) Date of Patent: May 24, 2005

(54) SYSTEM AND METHOD FOR CREATING A BOOT FILE UTILIZING A BOOT TEMPLATE

(75) Inventors: Kenneth Y. Ogami, Bothell, WA (US); Matthew A. Pleis, Carnation, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 537 days.

(21) Appl. No.: 09/989,819

(22) Filed: Nov. 19, 2001

(51) Int. Cl.$^7$ .............................................. G06F 17/50
(52) U.S. Cl. .......................... 713/2; 713/100; 702/120; 326/39
(58) Field of Search ..................... 713/2, 100; 702/120; 326/39

(56) References Cited

U.S. PATENT DOCUMENTS

| | | | | |
|---|---|---|---|---|
| 5,544,067 A | * | 8/1996 | Rostoker et al. ............... | 703/14 |
| 6,542,844 B1 | * | 4/2003 | Hanna ........................ | 702/120 |
| 6,614,320 B1 | * | 9/2003 | Sullam et al. ................ | 331/46 |
| 6,724,220 B1 | * | 4/2004 | Snyder et al. ................ | 326/39 |
| 6,732,347 B1 | * | 5/2004 | Camilleri et al. ............. | 716/16 |
| 6,792,584 B1 | * | 9/2004 | Eneboe et al. ................ | 716/8 |

* cited by examiner

Primary Examiner—A. Elamin
(74) Attorney, Agent, or Firm—Wagner, Murabito & Hao LLP (57) ABSTRACT

The present invention is a system and method of facilitating automatic generation of the source code in a convenient and efficient manner. In one embodiment of the present invention, a programmable system on a chip (PSoC) boot file generation method is utilized to create a boot file. A boot template file is created comprising special symbolic variable names that point to configuration registers within a programmable system on a chip (PSoC). User module selections are received with delineation of preferred configurations and functions associated with components of said programmable system on a chip (PSoC). Application files are automatically generated based upon user selections of PSoC configurations and functions. The special symbolic variable names are substituted or replaced with actual configuration register names. In one embodiment, a present invention programmable system on a chip (PSOC) boot file generation method also facilitates providing interrupt processing routines to the appropriate vector.

19 Claims, 7 Drawing Sheets

AREA    TOP (ROM, ABS)

| | |
|---|---|
| org 0 | ; Reset Interrupt Vector |
| jmp _start | ; First Instruction executed following a Reset |
| org 04h<br>`@INTERRUPT_1`<br>reti | ; Supply Monitor Interrupt Vector |
| org 08h<br>`@INTERRUPT_2`<br>reti | ; Block DBA00 Interrupt Vector |
| org 0Ch<br>`@INTERRUPT_3`<br>reti | ; Block DBA01 Interrupt Vector |
| org 10h<br>`@INTERRUPT_4`<br>reti | ; Block DBA02 Interrupt Vector |
| org 14h<br>`@INTERRUPT_5`<br>reti | ; Block DBA03 Interrupt Vector |
| org 18h<br>`@INTERRUPT_6`<br>reti | ; Block DCA04 Interrupt Vector |
| org 1Ch<br>`@INTERRUPT_7`<br>reti | ; Block DCA05 Interrupt Vector |
| org 20h<br>`@INTERRUPT_8`<br>reti | ; Block DCA06 Interrupt Vector |
| org 24h<br>`@INTERRUPT_9`<br>reti | ; Block DCA07 Interrupt Vector |
| org 28h<br>`@INTERRUPT_10`<br>reti | ; Analog Column 0 Interrupt Vector |
| org 2Ch<br>`@INTERRUPT_11`<br>reti | ; Analog Column 1 Interrupt Vector |
| org 30h<br>`@INTERRUPT_12`<br>reti | ; Analog Column 2 Interrupt Vector |
| org 34h | ; Analog Column 3 Interrupt Vector |

SYSTEM AND METHOD FOR CREATING A BOOT FILE UTILIZING A BOOT TEMPLATE

FIELD OF THE INVENTION

Embodiments of the present invention generally relate to the field of integrated circuit chips. More specifically, embodiments of the present invention pertain to a system and method for computer aided design for single-chip microelectronic systems.

BACKGROUND ART

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages (e.g., such as miniaturization, fast processing of signals, minimal power consumption, etc.) over discrete component circuits. However, traditional approaches to manufacturing and designing single-chip systems are often very complex and consume significant resources.

Electronic systems rely upon a variety of components included in integrated circuits to provide numerous functions. Microcontrollers are one example of integrated circuit components with characteristics that are potentially useful in a variety of applications. For example, microcontrollers are typically reliable and relatively economical to produce. Microcontrollers have evolved since they were first introduced and have substantially replaced mechanical and electromechanical components in numerous applications and devices. However, while traditional mircontrollers have some characteristics that are advantageous they also tend to be limited in the number of applications in which any given microcontroller can be utilized.

Traditionally each microcontroller was custom designed precisely for a narrow range of applications with a fixed combination of required peripheral functionalities. Developing custom microcontroller designs with particular fixed peripherals is time and resource intensive, typically requiring separate and dedicated manufacturing operations for each different microcontroller (which is particularly expensive for small volume batches). Even if a microcontroller may suffice for more than one application, it is still difficult to select an appropriate microcontroller for a particular application. Determining which one of the different available particular microcontroller designs is best suited for a particular application is challenging. In addition, the unique aspects of the intended application often make it difficult to find an optimum microcontroller, usually necessitating a compromise between the convenience of using an existing microcontroller design and less than optimum performance. Even when a suitable microcontroller is found, subsequent changes to the application and new requirements placed on the application can lead to the need for a totally different microcontroller.

Application specific integrated circuits (ASICs) may appear to address some of the issues associated with finding a suitable microcontroller for a particular application, but they tend to present significant hurdles. ASICs can be problematic because they tend to require a sophisticated amount of design expertise and the obstacles of long development times, high costs, and large volume requirements still remain. Prior attempts at providing limited flexibility by the use of gate arrays and or other logic components are very expensive and require a sophisticated level of design expertise. Even after determining what functions and configurations is desirable, additional significant resources are necessary in systems requiring software code for the performance of appropriate functions.

Numerous electronic devices require some type of boot sequence to begin operations. Some traditional integrated circuit designs required the generation of programmed boot code that directs the sequence of boot operations performed by components included in the integrated circuit. Traditionally the programmed boot code is manually written by an application programmer, requiring the programmer to have knowledge of all the components and the numerous logical values (such as a bit stream) that direct a component to perform desired functions. Furthermore, different boot configurations and functions typically result in interrupts to different vectors and tracking the corresponding interrupt vector is very difficult and often susceptible to erroneous coding.

What is required is a system and method of facilitating automatic generation of the boot sequence instructions in a convenient and efficient manner.

SUMMARY

The present invention is a system and method of facilitating automatic generation of the boot sequence instructions in a convenient and efficient manner. In one embodiment of the present invention, an electronic device boot file generation method is utilized to create a boot file. A boot template file is created comprising special symbolic variable names that point to configuration registers within an electronic device. In one embodiment of the present invention the electronic device is a programmable device. User module selections are received with delineations of preferred configurations and functions associated with components of the programmable device. Application files are automatically generated based upon user module selections of configurations and functions utilizing the symbolic variable register names. Subsequent to user module selections, special symbolic variable register names are substituted or replaced with actual configuration register names. In one embodiment, a present invention programmable device boot file generation method also facilitates providing the appropriate interrupt vectors to their respective interrupt processing routines.

In one exemplary implementation of the present invention an electronic device boot file generation method is performed by the electronic device's software design tool. The tool provides an interface for selecting applicable user modules, facilitates programming of desired functionality into the target device; and executes an assembler process. The tool produces a configuration image that defines configurations and functionalities of the electronic device and are stored in a memory included in the electronic device. The configuration image data may be generated and loaded on the electronic device in various manners including by one embodiment of a present invention. A software design tool comprising an editor for defining user module personalization and parameterization, an application editor for editing and compiling automatically generated and user created application program interface (API) code, and a debugger assisting debugging operations through emulation of the target device.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Figure 1:
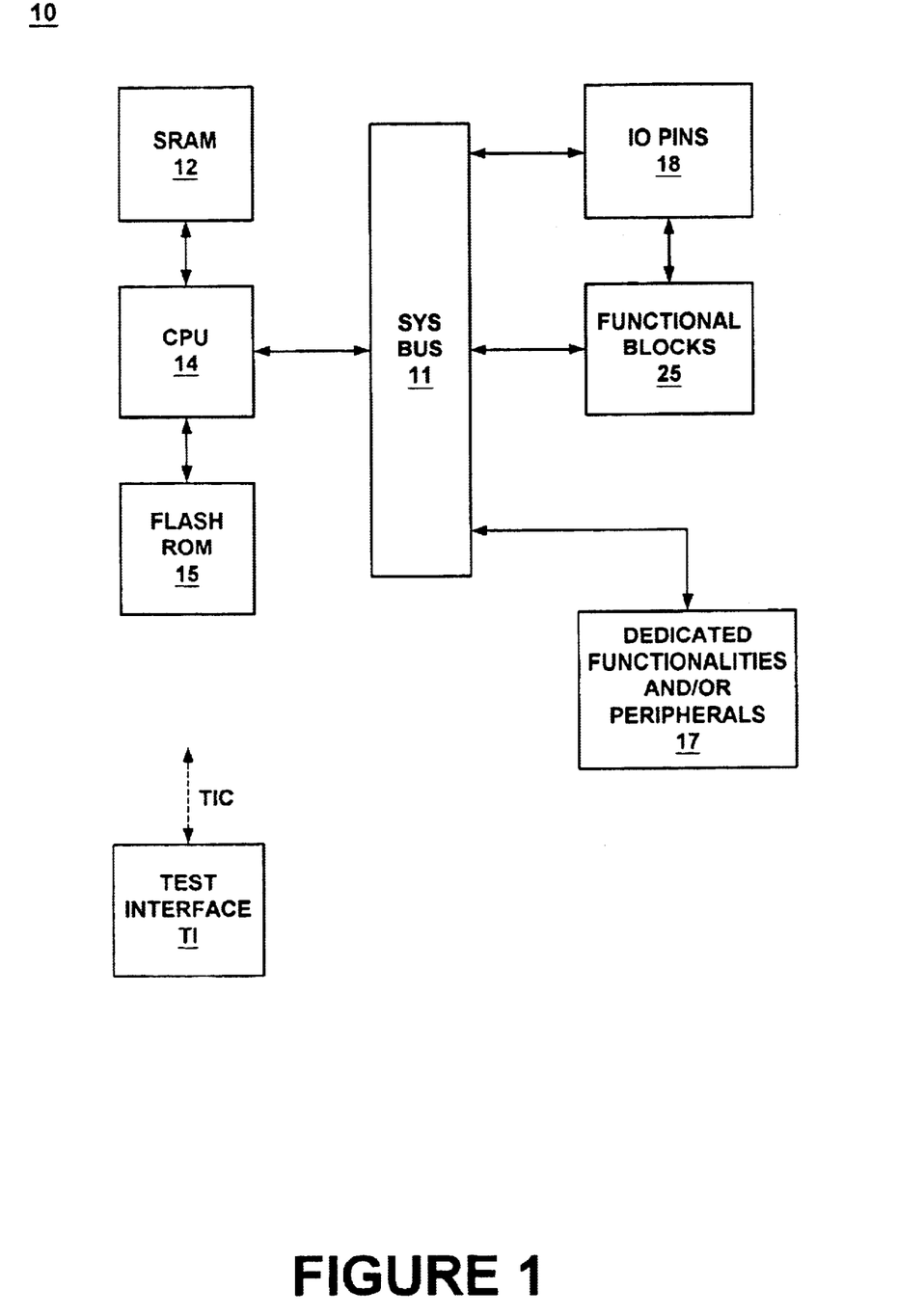
FIG. 1 is a block diagram showing a high level view of an exemplary integrated circuit (e.g., a microcontroller) upon which embodiments of the present invention may be implemented.

FIG. 1 is a block diagram showing a high level view of an exemplary integrated circuit (e.g., a microcontroller) 10 upon which embodiments of the present invention may be implemented. In one embodiment, integrated circuit 10 includes a communication bus 11, static random access memory (SRAM) 12, central processing unit (CPU) 14, flash read-only memory (ROM) 15, input/output (I/O) pin(s) 18 and functional component 25. Communication bus 11 is electrically coupled to static random access memory (SRAM) 12, central processing unit (CPU) 14, flash read-only memory (ROM) 15, input/output (I/O) pin(s) 18 and functional component 25. Static random access memory (SRAM) 12 stores volatile or temporary data during firmware execution. Central processing unit (CPU) 14 processes information and instructions. Flash read-only memory (ROM) 15 stores information and instructions (e.g., firmware). In one embodiment of the present invention, flash read-only memory (ROM) 15 stores configuration image data. Input/output (I/O) pin(s) 18 provides an interface with external devices (not shown). Functional component 25 is programmable to provide different functions and configurations.

It is appreciated that integrated circuit 10 is readily adaptable to include a variety of other components. In one exemplary implementation, integrated circuit 10 also includes a dedicated functionality internal peripheral component 17 which is coupled to system bus 11 in addition to the functional component 25. An optional test interface (TI) may be coupled to integrated circuit 10 via a test interface coupler (TIC), which may be detachable, to perform debugging operations during startup and initialization of the integrated circuit. In one embodiment of the present invention, additional functions such as clocking and power control are provided by a variety of components including a precision oscillator and phase locked loop (PLL), a voltage reference, a 32 kHz crystal oscillator (which may be utilized for a variety of applications such as calibration and synchronization, etc.), an interrupt controller (for generating interrupt signals as required), a power on reset control unit (for performing functions related to power supply stability), and a brown-out detection unit (which detects substandard, subnominal power system parameters).

Figure 2A:
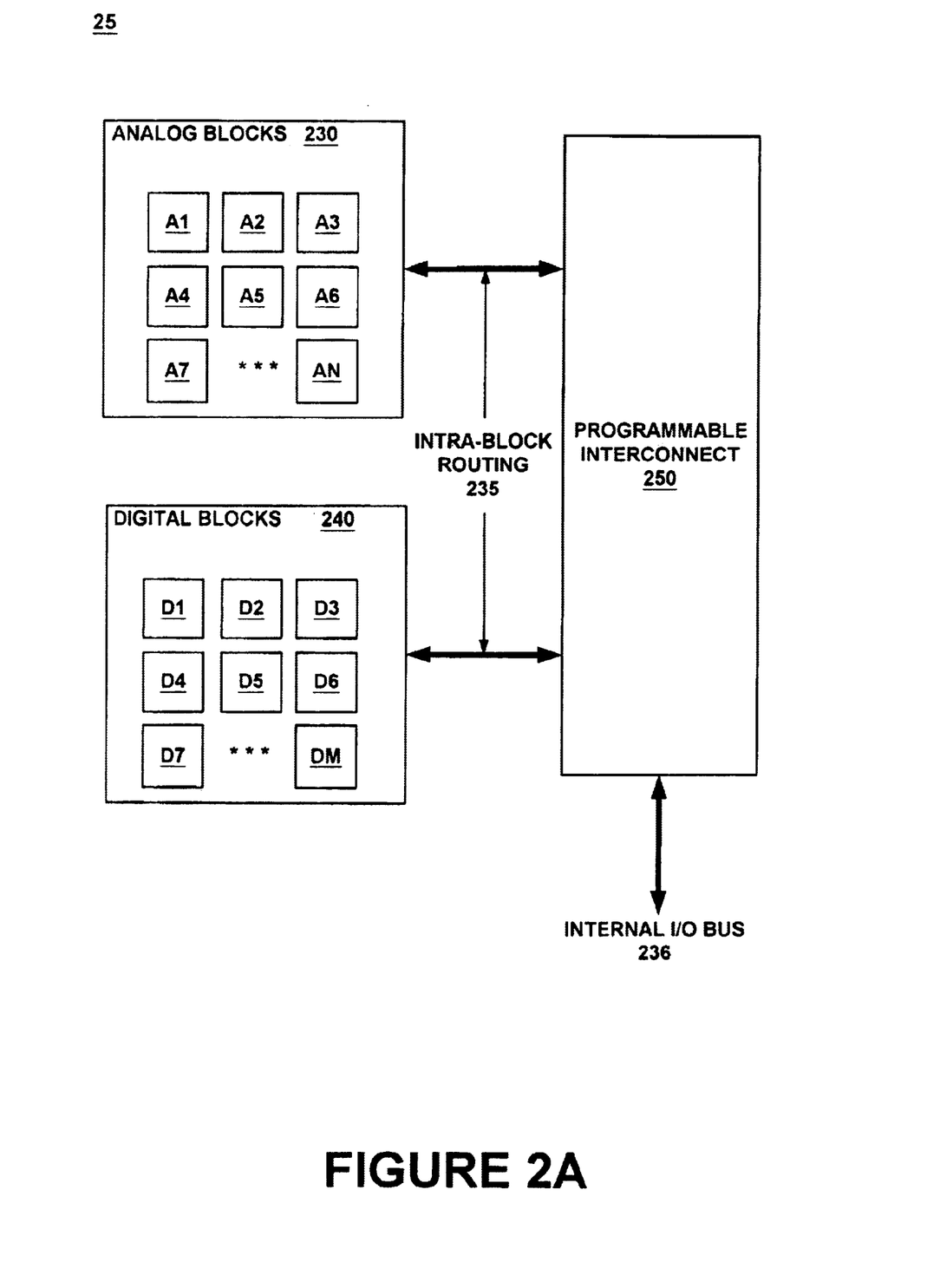
FIG. 2A is a block diagram of one embodiment of a functional component depicted in greater detail.

Referring to FIG. 2A, an embodiment of functional component 25 is depicted in greater detail. In this embodiment, functional component 25 includes an analog functional block 230, a digital functional block 240, and a programmable interconnect 250. In one exemplary implementation, analog functional block 230 includes a matrix of interconnected analog functional blocks A1 through AN. The number N may be any number of analog functional blocks. Likewise, digital block 240 includes a matrix of interconnected digital functional blocks D1 through DM. The number M may be any number of digital functional blocks.

The analog functional blocks A1 through AN and the digital functional blocks D1 through DM are fundamental building blocks (e.g., fundamental circuits) that may be combined in a variety of configurations to accomplish a variety of functions. The functional blocks are programmably configurable to perform different functions. In the present embodiment, the functional blocks include elements with changeable characteristics that can be specified according to the function to be performed. Inputs received by a functional block are directed through and manipulated by the functional block according to the specified characteristics of the elements. A combination of functional blocks and the characteristics of their elements can be dynamically programmed to perform a desired function. Importantly, different combinations of blocks producing different functions, may exist at different times within the same system. For example, a set of functional blocks configured to perform the function of analog-to-digital conversion may sample a signal. After processing that signal in the digital domain, some or all of those same blocks (perhaps in conjunction with others) may be recombined in a different configuration to perform the function of digital-to-analog conversion to produce an output signal.

The present invention is readily adaptable for use with numerous functional blocks that are programmably configurable to provide a variety of functions. Exemplary functional peripherals include timers, controllers, serial communications units, Cycle Redundancy Check (CRC) generators, Universal Asynchronous Receiver/transmitters (UARTS), amplifiers, programmable gain components, digital to analog converters, analog to digital converters, analog drivers, and various filters (e.g., high-, low-, and band-pass). In one exemplary implementation higher order user modules (e.g., modems, complex motor control, sensor devices, etc.) are created with combinations of functional blocks. Co-pending commonly-owned incorporated U.S. patent application Ser. No. 10/033,027, filed October 2001, entitled "PROGRAMMABLE MICROCONTROLLER ARCHITECTURE," which is hereby incorporated by this reference, includes additional details on exemplary implementations of present invention integrated circuits (e.g., integrated circuit 10) and functional components (e.g., functional component 25).

In one embodiment of the present invention, the programmable configuration of integrated circuit 10 components is facilitated by memory (e.g., configuration registers) included in the integrated circuit. In one exemplary implementation of the present invention, the memory includes configuration registers that store a series of logical values (e.g., logical 1 or 0 corresponding to a predetermined voltage level) corresponding to a particular configuration and/or function for an integrated circuit 10 functional block. The series of logic values are programmably configurable and in one embodiment of the present invention the logical values loaded in a configuration register are defined by a configuration image (e.g., stored in a system memory 17).

In one embodiment of the present invention, a functional component (e.g., functional component 25) includes registers that are programmably configurable to store configuration data that defines the combination (e.g., electrical coupling) of the functional blocks and the characteristics (e.g., parameters) of the respective functional block elements. When a value is changed in a configuration register, the configuration and/or functionality of a corresponding integrated system 10 component is changed accordingly. In one exemplary implementation of the present invention, some functional blocks are configured to affect autonomous system operations, such as interrupts.

Figure 2B:
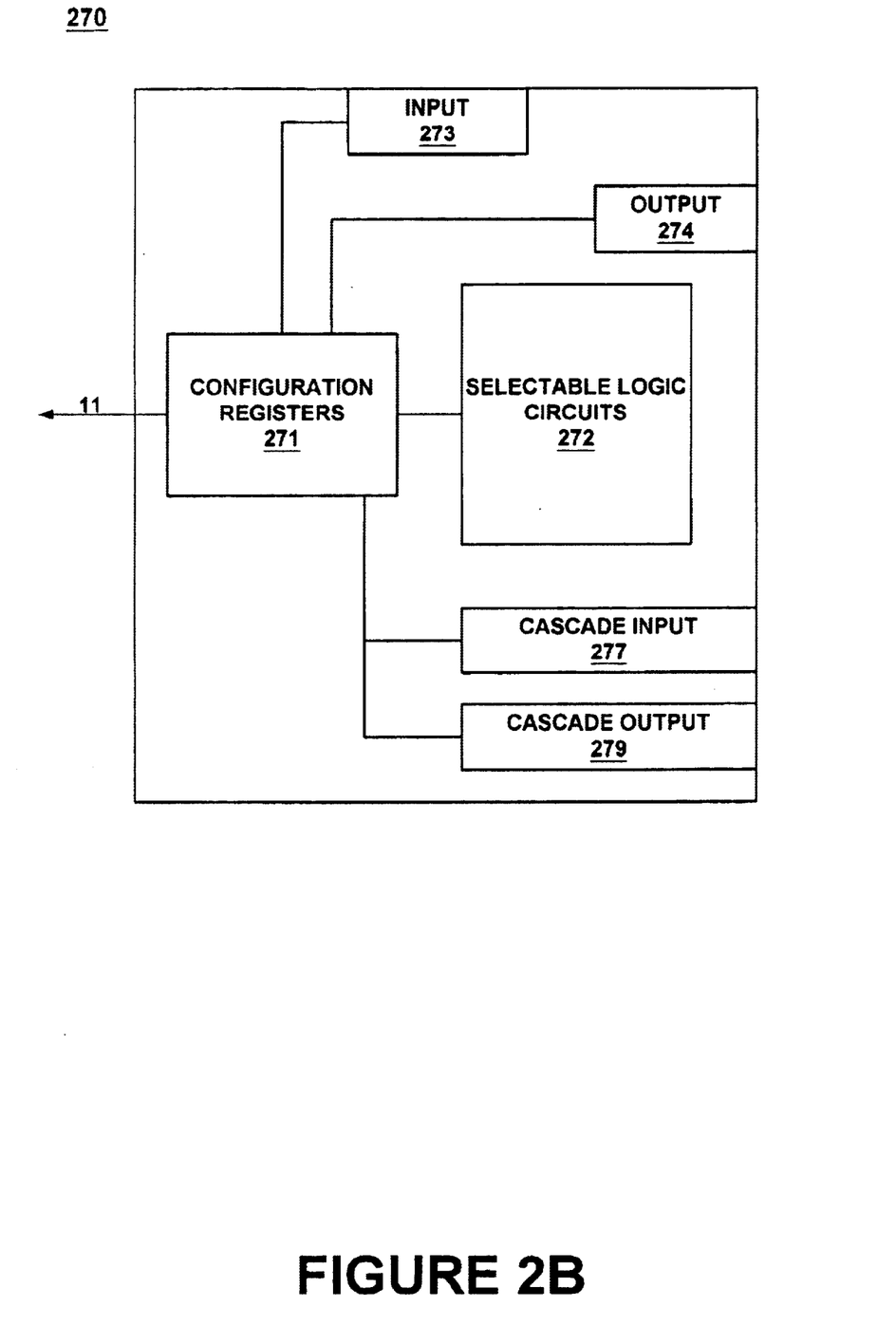
FIG. 2B is a block diagram of one embodiment of a functional block, included in an exemplary implementation of the present invention.

FIG. 2B is a block diagram of functional block 270, one embodiment of a present invention functional block (e.g., A1, D1, etc.). Functional block 270 comprises configuration register(s) 271, selectable logic circuits 272, input 273, output 274, cascade input 277, and cascade output 279. Configuration register(s) 271 is coupled to selectable logic circuits 272, input 273, output 274, cascade input 277, and cascade output 279. Configuration register(s) 271 stores configuration data that defines the configuration and functionality of the other components of functional block 270. Selectable logic circuits 272 are circuit components that provide a variety of functions in accordance with the configuration data stored in configuration register(s) 271. Input 273 and output 274 provide inputs and outputs respectively to other components of integrated circuit 10 in accordance with the configuration data stored in configuration register(s) 271. Cascade input 277 and cascade output 279 provide inputs and outputs respectively to other cascaded functional blocks in accordance with the configuration data stored in configuration register(s) 271. In one embodiment there are four configuration registers per block, with a capacity of eight bits per register.

A hierarchy of programmable interconnectivity is implemented within system 10. Continuing with reference to FIG. 2A, each individual functional block or unit (e.g., analog blocks A1 through AN and digital blocks D1 through DM) may communicate and interact with each and/or any other functional block or unit and/or communication bus 11. Analog functional blocks 230 and digital functional blocks 240 are communicatively coupled to programmable interconnect 250 by intra-block routing 235 in the present exemplary embodiment. Which functional unit communicates with which other functional unit and/or communication bus 11 is programmably configurable via the programmable interconnect 250 in the present exemplary embodiment. In one exemplary implementation of the present invention, analog functional blocks 230 and digital blocks 240 include internal matrices that facilitate coupling of signals between the function blocks in accordance with programmed configuration data.

In the present exemplary embodiment, programmable interconnect 250 comprises a configuration system and a global mapping system. The configuration system is coupled to communication bus 11 and the global mapping system, which in turn is coupled to functional component 25. The configuration system is programmably configurable to selectively couple with communication bus 25 and/or the global mapping system. The global mapping system facilitates selective coupling of functional blocks included in functional component 25 to other functional blocks and/or communication bus 11. In one exemplary implementation, the global mapping system includes an input global mapping component and an output global mapping component.

In one embodiment of the present invention, programmable interconnect 250 includes configuration registers. The values in the configuration registers are utilized to establish electrically conductive paths between components of integrated circuit 10. In one exemplary implementation of the present invention the configuration registers facilitate electrical coupling of functional blocks to each other and to other components of integrated circuit 10 (e.g., processor 14).

In one embodiment of the present invention, which functional block and/or other components of integrated system 10 are electrically coupled to an I/O pin is configurably programmable via programmable interconnect 250. In the present exemplary implementation, programmable interconnect 250 is connected via an internal input/output (I/O) bus 236 to a configurable I/O port (e.g., pin 18 in FIG. 1). Each pin of the configurable I/O port is programmably configured on a pin by pin basis. For example, in a first configuration a first I/O port pin (e.g., I/O pin(s) 18) is configured to function as an input and a second I/O pin is configured to function as an output, and in a second configuration the first I/O port pin is configured to function as an output and the second I/O pin is configured to function as an input. The total pin count of a pin-by-pin configurable I/O port (e.g., I/O pin(s) 18) may vary from one application to another, depending on the system device under consideration. An I/O routing modality incorporating features of the present embodiment enables flexibly configurable I/O ports to establish a specific pin locale or pin for the conveyance of particular external signals (e.g., to or from an external device) on pin by pin basis, greatly enhancing user convenience and system applicability.

In one embodiment of the present invention, a system timing block is included to provide timing information used for synchronizing and otherwise effectuating interfacing between system functionalities (e.g., functional blocks). The system timing block like the functional component 25 is programmable. Advantageously, this allows the system timing block to generate a myriad of different time bases, as required for any particular application the system is being configured to effectuate. These time bases may be fed into analog functional blocks and digital functional blocks for use therein, via the programmable interconnect. Examples of analog functions requiring such time bases include conversions, modulations, and the like. One striking example of a digital function requiring such time bases is a universal asynchronous receiver transmitter (UART) functionality.

There are a variety of critical system files that control the configuration of a programmable electronic device. In one exemplary implementation of the present invention, a boot file (e.g. boot.asm) that defines the boot sequence and controls boot operations resides in a source tree (e.g., under Source Files). In one embodiment of the present invention, the tool providing the automatic creation of assembly source code files (e.g., based upon user module descriptions) utilizes a boot template to generate the boot source code included in the boot file. In one exemplary implementation of the present invention, the template file comprises special symbolic variable register names that stand for (or point to) configuration registers. In one embodiment, the template file also facilitates mapping of appropriate interrupt vectors to their respective interrupt processing routines.

When design changes are made to configuration and functions of the components and configuration image source code is automatically generated it is very difficult to track the actual configuration registers that are assigned to a user module, the appropriate values for loading into configuration registers, and respective appropriate interrupt vectors for interrupt processing routines. It is significantly easier to track appropriate values with special symbolic variable register names during changes and automatic generation of configuration image code. After a configuration image is automatically generated, symbolic substitution is then performed to substitute the actual register name with its variable symbolic name place holder, and to assign appropriate interrupt vectors to interrupt processing routines. The template file facilitates substitution operations by providing a correlation between the special symbolic variable register names and the actual register names. The template file facilitates substitution operations by providing a correlation between appropriate interrupt vectors and their correct respective interrupt processing routines.

The registers utilized by a user module can change depending on the placement of the user modules in the underlying hardware. Manually tracking requisite changes in register assignment and appropriate interrupt vectors is particularly difficult. In one embodiment of the present invention changes made to the boot file (e.g., boot.asm) get overwritten when automatic generation of application source code is performed. In one embodiment of the present invention a user is permitted to hard code a change in the boot.tpl file if a user does not want changes to a boot.asm file overwritten.

Figure 3A:
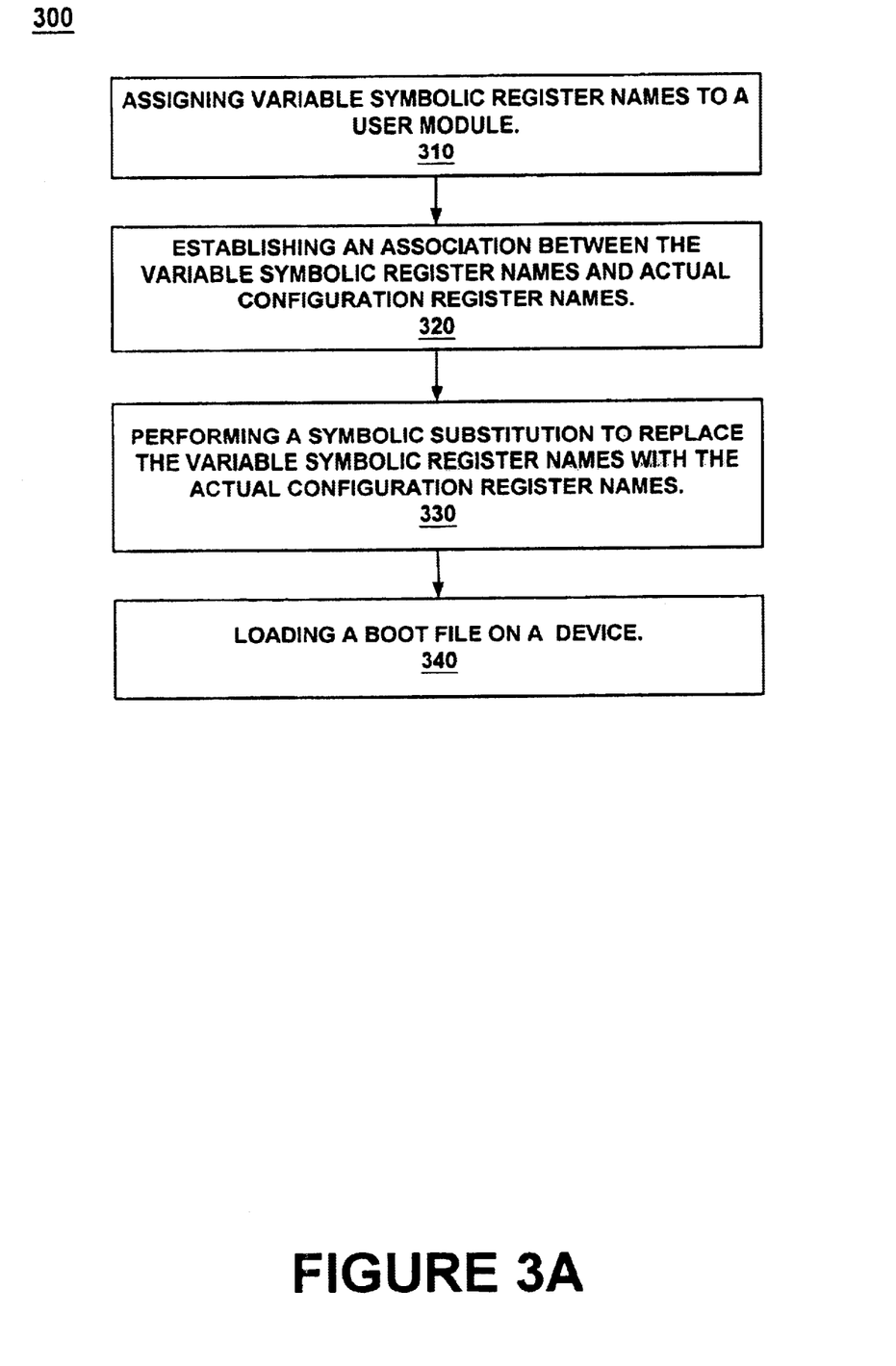
FIG. 3A is a flow chart of one embodiment of a present invention boot file creation method.

FIG. 3A is a flow chart of one embodiment of a present invention boot file creation method 300. Boot file creation method 300 facilitates creation of a boot file. In one embodiment, boot file creation method 300 utilizes symbolic register names when changes are being made to a configuration or boot file. This relieves a user from tedious manual tracking of actual configuration registers and complicated impacts changes have on the assignment of a particular configuration register or interrupt vector for a particular user module.

In one embodiment of the present invention, boot file creation method 300 is implemented on a design tool (e.g., a computer implemented software design tool). Additional details on an exemplary implementation of a present invention design tool are set forth in copending commonly-owned U.S. patent application Ser. No. 09/989,570, filed Nov. 19, 2001, entitled "METHOD FOR FACILITATING MICROCONTROLLER PROGRAMMING", which is hereby incorporated by this reference.

In step 310, variable symbolic register names are assigned to a user module. In one embodiment of the present invention, a user module is a preconfigured function that may be based on more than one functional block.

In step 320 an association is established between the variable symbolic register names and actual configuration register names. In one embodiment of the present invention, a boot template is utilized to establish the association between the variable symbolic register names and actual configuration register names. In one embodiment of the present invention, an association is also established between appropriate interrupt vectors and interrupt services routines.

Figure 3B:
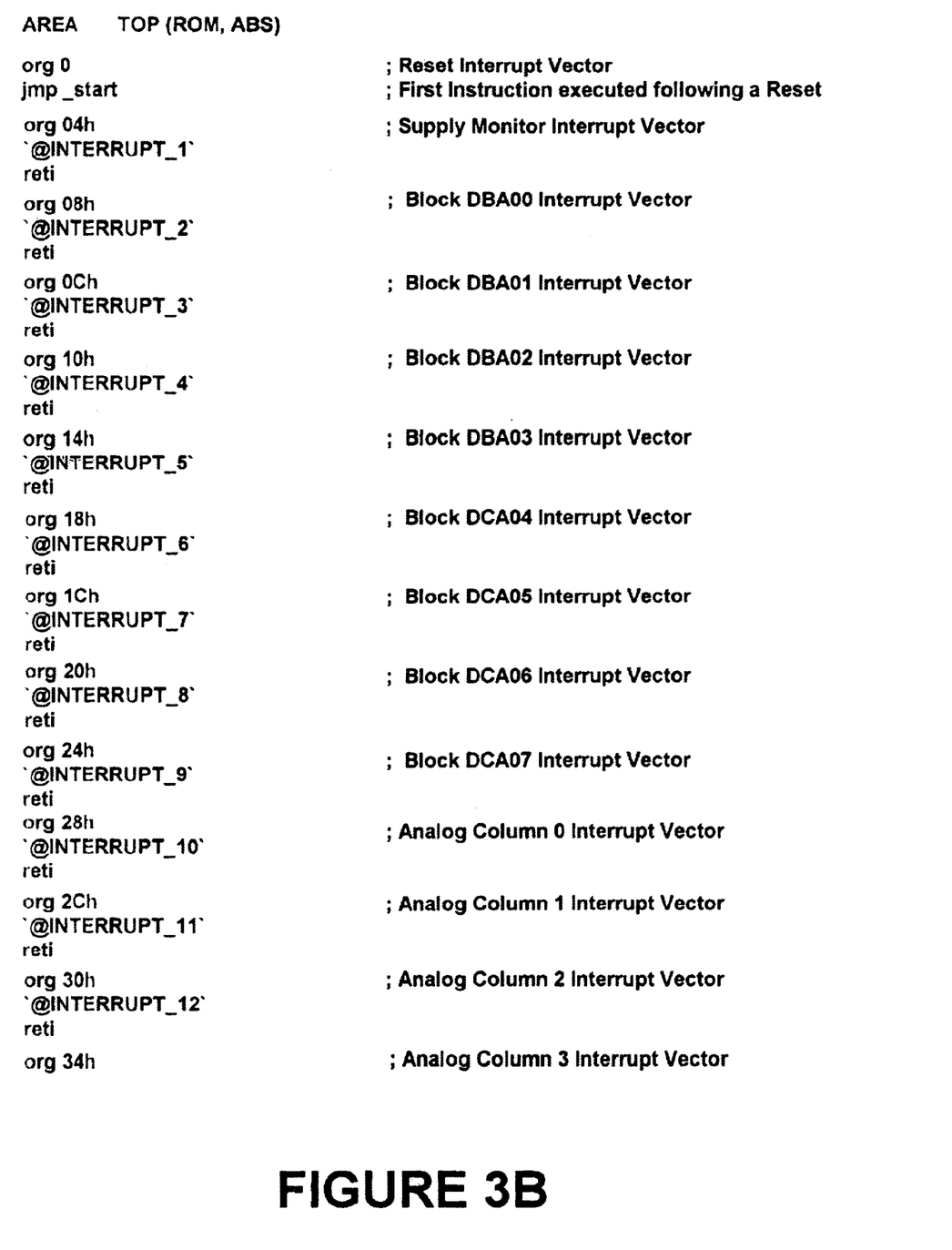
FIG. 3B is a table illustrating one embodiment of an interrupt vector mapping table of the present invention.

In step 330 a symbolic substitution is performed to replace the variable symbolic register names with actual configuration register names. In one embodiment of the present invention, the boot template is utilized to perform the symbolic substitution. The symbolic substitution replaces the variable symbolic register names with the actual configuration register names. In one embodiment of the present invention, the symbolic substitution includes automatic interrupt vector mapping that assigns the appropriate interrupt vector to an interrupt service routine. FIG. 3B is a table illustrating one embodiment of an interrupt vector mapping table of the present invention. In one exemplary implementation of the present invention, the symbolic symbols located at specific ROM locations are replaced with actual instructions so that the interrupt vector picks up the correct instruction for a user module.

In step 340 the boot file is loaded on a target device. In one embodiment the boot file is created and loaded on a target device by a design tool.

Figure 4:
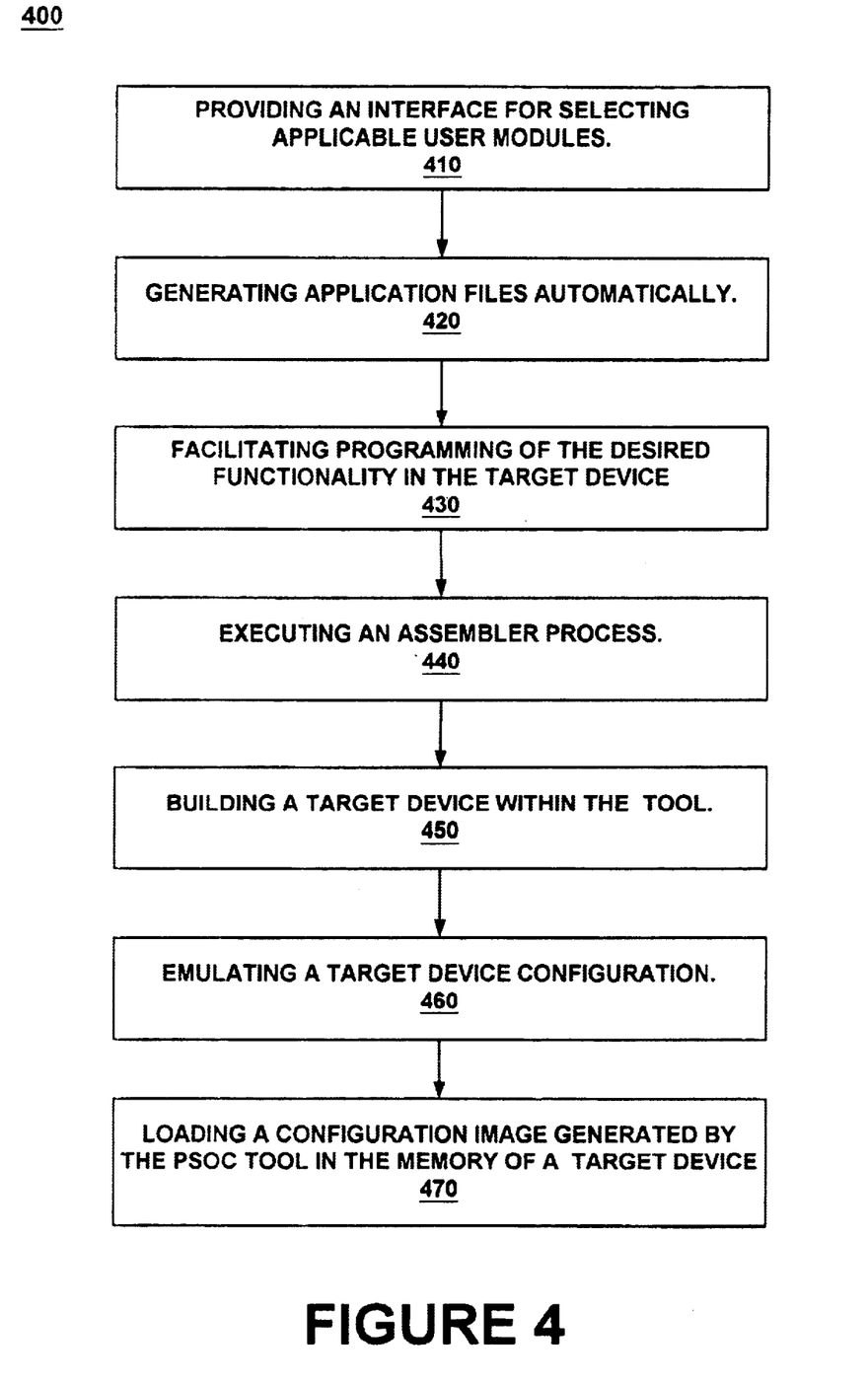
FIG. 4 is a flow chart of a design tool process illustrating exemplary steps used by a design tool in accordance with one embodiment of the present invention.

In one embodiment of the present invention, configuration images are provided by a design tool. FIG. 4 is a flow chart of a design tool process 400, which illustrates exemplary steps used by a design tool in accordance with one embodiment of the present invention. One embodiment of an exemplary computer system utilized to implement design tool process 400 is set forth in incorporated U.S. patent application Ser. No. 09/989,570, filed Nov. 19, 2001, entitled "METHOD FOR FACILITATING MICROCONTROLLER PROGRAMMING". Design tool process 400 facilitates configuration, programming, building, emulation and debugging of a customized "target device." In one exemplary implementation the target device is similar to integrated circuit 10 of FIG. 1 with a functional component 25 similar to FIG. 2A. In one embodiment, design tool process 400 is carried out by a computer system under the control of computer-readable and computer-executable instructions. The computer-readable and computer-executable instructions reside, for example, in data storage features of the computer system such as a computer usable volatile memory, computer-usable nonvolatile memory and/or data storage device. The computer-readable and computer-executable instructions direct computer system operations in accordance with design tool process 400.

In step 410, an interface for selecting applicable "user modules" is provided. In one embodiment of the present invention, a user module is a preconfigured function that may be based on more than one functional block. In one exemplary implementation a user module when programmed and loaded on a memory of the target device directs a functional block to work as a peripheral on the target device. At any time in design tool process 400, user modules may be added to or removed from the target device. The selected user modules are associated with (e.g., "placed" or "mapped to") representations of functional blocks defined in the design tool. Once a user module is associated with a representation, its parameters can be viewed and modified as needed. Global parameters used by a plurality of user modules (for example, CPU clock speed) can also be set. In one embodiment of the present invention, interconnections between selected user modules are specified (e.g., either as each user module is placed or afterwards). The pin-out for each block can also be delineated, making a connection between the software configuration and the hardware of the target device.

In step 420, application files are automatically generated. When application files are generated, existing assembly-source and C compiler code are updated for device configurations. In one embodiment of the present invention application program interfaces (APIs) and interrupt service routines (SRIs) are generated.

In step 430, programming of the desired functionality into the target device is facilitated. In one embodiment of the present invention, source code files can be edited, added or removed. In one embodiment of the present invention, programmable configuration of external device ports is also facilitated by design tool process 400.

In step 440, an assembler process is executed. The assembler operates on an assembly-language source to produce executable code. This code is compiled and built into an executable file. In one embodiment of the present invention, the executable file is downloaded into an emulator, where the functionality of the target device will be emulated and debugged.

In step 450 the target device is "built" within the design tool. Building the target device in the design tool includes linking the programmed functionalities of the source files (including device configuration). In one exemplary implementation of the present invention, the linked programmed functionalities and the source files are downloaded to an emulator for debugging in step 450.

In step 460, the target device is emulated using an in-circuit emulator for debugging. The emulator allows the target device to be tested in a hardware environment while device activity is viewed and debugged in a software environment.

In step 470 a configuration image generated using design tool process 400 is loaded into memory of a target device. In one embodiment of the present invention a plurality of configuration images are loaded into memory of a target device.

Although specific steps are disclosed in design tool process 400 of FIG. 4, such steps are exemplary. That is, the present invention is well suited to use with various other steps or variations of the steps recited in process 400. Additionally, for purposes of clarity and brevity, the discussion is directed at times to specific examples. The present invention design tool process 400, however, is not limited solely to use to design a particular target device (e.g., a microcontroller). Instead, the present invention is well suited to use with other types of computer-aided hardware and software design systems in which it is necessary to accomplish a multitude of tasks as part of an overall process.

Figure 5:
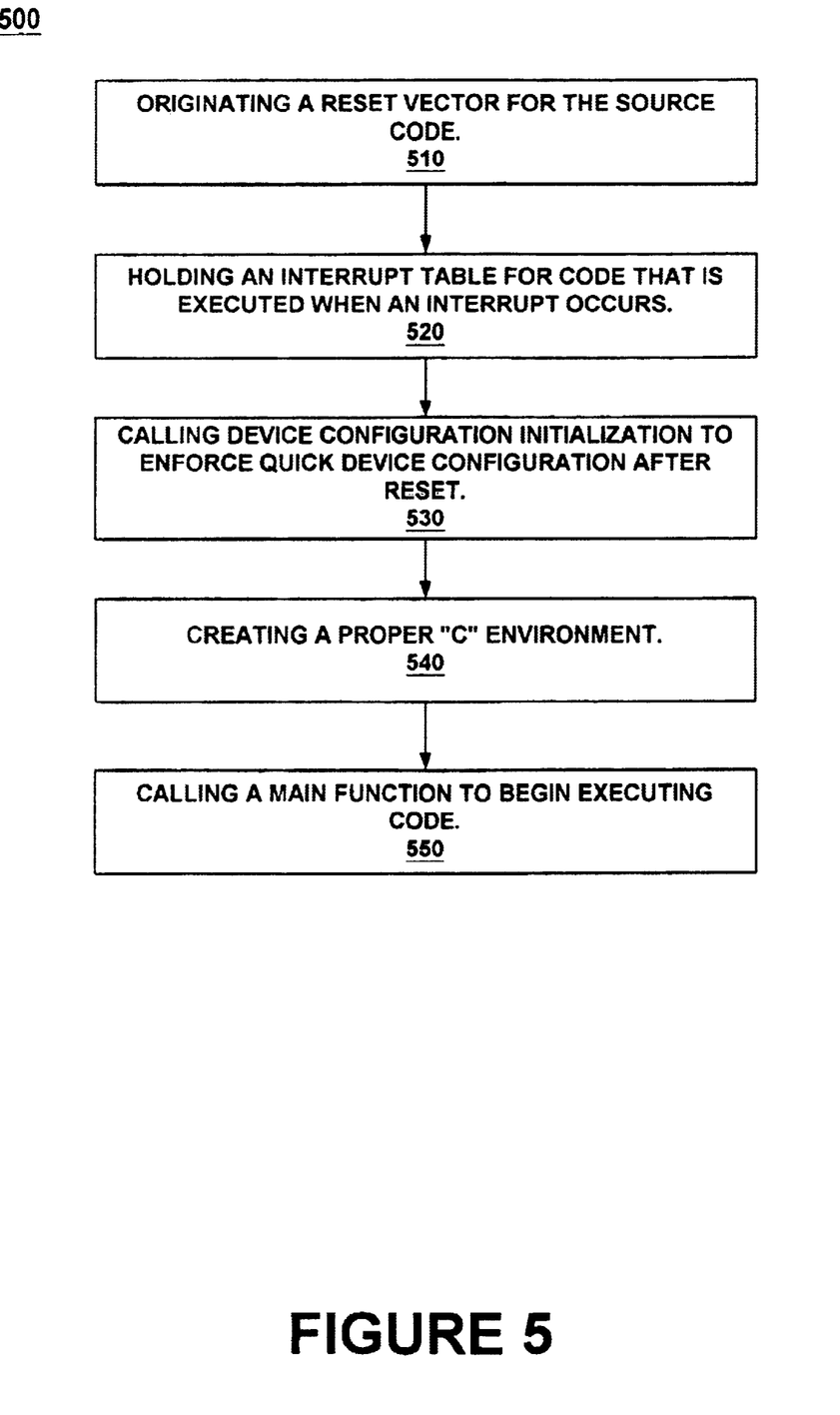
FIG. 5 is a flow chart of one embodiment of a present invention boot sequence.

In one embodiment of the present invention the components of a target device follow a boot sequence. FIG. 5 is a flow chart of one embodiment of a present invention boot sequence. The boot sequence is dictated by the information included in a boot file (e.g., boot.asm).

In step 510, a reset vector for the source code is originated after a target device is powered up.

In step 520, an interrupt table is held for code that is executed when an interrupt occurs. In one embodiment of the present invention, the interrupt table is held while a symbolic substitution process (e.g., step 330 of boot file creation method 300) is utilized to provide the appropriate interrupt service routine code. In one exemplary implementation, a boot table (e.g., boot.tbl) is used for automatic generation of interrupt vector table entries that map a user module interrupt to appropriate interrupt service routine code in a correct ROM location. Correct device configuration initialization successfully occurs because an appropriate substitution file that provides correct values and interrupt service routine code in the right location is created (e.g., with a call to LoadConfig) for each configuration change.

In one embodiment of the present invention, some characteristics of the interrupt table are determined by the hardware of the target device. In one exemplary implementation, the hardware dictates that the interrupt entry points are 4 bytes apart beginning at program counter location zero (e.g., reset). Local jumps are enforced when an interrupt handler is originated (ORGed) within close proximity to (e.g., exactly at) the interrupt vectors. Therefore, a "long jump" (e.g., 3 byte long call) may be utilized and the vector table will not fall out of alignment (will not overrun into the next interrupt vector instruction).

The present invention conveniently provides automatic interrupt routing based upon the selection and configuration of user modules. One example of correct automatic interrupt routing includes the exemplary long jump discussed above. A user module that requires 4 bytes of a different kind of code that is extremely fast (e.g., increment a number and then return from the interrupt) is another example of an automatic interrupt service routine code generation that can be performed by the present invention. For example, a present invention design tool has the ability to occupy the 4 bytes in an optimal manner for an interrupt. If the user module is moved (e.g., 5 blocks over) appropriate interrupt service routine code will automatically be generated by a present invention symbolic substitution process (e.g., boot file creation method 300) relieving the user from manually tracking and providing this information.

In step 530 device configuration initialization is called to enforce quick device configuration after reset.

In step 540 a proper "C" environment is created. In one embodiment a proper C environment is created to address certain types of initializations required by the "C" code. In one embodiment of the present invention the "C" initialization is optionally provided even if the application is built using only assembly code.

In step 550 a main function is called to begin executing code.

The boot file is regenerated every time device configurations change and application files are generated. In one embodiment of the present invention, this ensures that interrupt handles are consistent with the configuration. Whenever the application files change (e.g., due to changes in the configurations or functions of a device design) the boot.asm is regenerated to ensure that interrupt handlers are consistent with the configuration. In one embodiment of the present invention the template file for the boot file (e.g., boot.tpl template for boot.asm) belongs to the design tool. It is recommended that a user does not make changes to the boot.asm file. However, in one embodiment of the present invention a user is permitted to hard code a change in boot.tpl file if a user does not want changes to a boot.asm file overwritten.

During the automatic source code generation processes of the present invention, the boot.asm file is constructed using the boot.tpl. For example, symbolic register names are replaced with the actual register names and appropriate interrupt vectors are mapped to their correct respective interrupt processing routines. The final boot.asm file is then completed. It is appreciated that the present invention substitution process is readily adaptable to a variety of applications, for example other source code files can also be automatically created using the present invention template procedure. The customer can easily modify the boot.tpl to insert their changes to boot.asm source without being lost during code generation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A boot file generation method comprising:
   creating a boot template file comprising symbolic variable names that point to configuration registers within a programmable device;
   receiving user module selections with delineation of preferred configurations and functions associated with components of said programmable device;
   generating application files automatically based upon user selected configurations and functions; and
   substituting said symbolic variable names with actual configuration register names.

2. A boot file generation method of claim 1 further comprising automatic interrupt vector mapping which assigns the appropriate providing interrupt processing routine vector.

3. A boot file generation method of claim 1 further comprising:
   providing an interface for selecting applicable user modules;
   facilitating programming of desired functionality into the programmable device; and
   executing an assembler process.

4. A boot file generation method of claim 3 wherein said user module is a preconfigured function that may be based on more than one lock that work as a peripheral on the programmable device.

5. A boot file generation method of claim 3 further comprising:
   viewing and modifying user module parameters including setting global parameters;
   specifying interconnections between the selected user modules; and
   delineating a pin-out for each functional block making a connection between the software configuration and the hardware of the programmable device.

6. A boot file generation method of claim 1 further comprising emulating the programmable device using an in-circuit emulator for debugging.

7. A boot file generation method of claim 6 wherein the emulator allows the programmable device to be tested in a hardware environment while device activity is viewed and debugged in a software environment.

8. A boot file generation method of claim 3 further comprising:
   updating existing assembly source and C compiler code for device configurations; and
   generating application program interfaces (APIs) and interrupt service routines (ISRs).

9. A boot file generation method of claim 3 wherein the assembler process comprises operating on an assembly-language source code to produce executable code.

10. A boot file generation method of claim 9 further comprising compiling and building code into an executable file.

11. A boot file generation method of claim 9 further comprising linking programmed functionalities including device configuration.

12. A circuit comprising:
   a bus for communicating data;
   a microprocessor for processing data, said microprocessor coupled to said bus;
   a functional component coupled to said bus, wherein said functional component includes a plurality of functional blocks programmable to provide a plurality of functions and configurations; and
   a memory for storing configuration information including information associated with a boot file, wherein said boot file is created utilizing a template comprising symbolic register names that are substituted by the actual register name, said memory coupled to said bus.

13. The circuit of claim 12, wherein a component of said circuit is programmable according to a configuration information stored in said memory.

14. A boot file creation method comprising:
   assigning variable symbolic register names to a user module;

establishing an association between the variable symbolic register names and actual configuration register names; and replacing the variable symbolic register names with actual configuration register names.

15. The boot file creation method of claim 14 further comprising loading the boot file on a target device.

16. A boot file creation method of claim 14 further comprising utilizing a boot template to establish the association between the variable symbolic registers names and actual configuration register names.

17. A boot file creation method of claim 16 further utilizing the boot template to replace the variable symbolic register names with the actual configuration register names.

18. A boot file creation method of claim 14 further comprising regenerating the boot file is when a device configuration changes.

19. A boot file creation method of claim 14 wherein the boot file is created and loaded on a target device by a design tool.

* * * * *